United States Patent
Reichenbach

(10) Patent No.: US 7,107,506 B2
(45) Date of Patent: Sep. 12, 2006

(54) METHOD OF DETECTING TWO-DIMENSIONAL CODES

(75) Inventor: Juergen Reichenbach, Emmendingen (DE)

(73) Assignee: Sick AG, Waldkirch (DE)

( * ) Notice: Subject to any disclaimer, the term of this patent is extended or adjusted under 35 U.S.C. 154(b) by 344 days.

(21) Appl. No.: 10/146,646

(22) Filed: May 14, 2002

(65) Prior Publication Data

US 2003/0009725 A1    Jan. 9, 2003

(30) Foreign Application Priority Data

May 15, 2001    (DE) ................................ 101 23 406

(51) Int. Cl.
*H03M 13/00* (2006.01)

(52) U.S. Cl. ...................... 714/758; 382/309

(58) Field of Classification Search ................ 714/752, 714/786, 746, 775, 784, 814, 760, 758; 703/13; 341/159; 327/190; 382/309
See application file for complete search history.

(56) References Cited

U.S. PATENT DOCUMENTS

| | | | |
|---|---|---|---|
| 3,735,390 A * | 5/1973 | Drangeid et al. ........... 341/133 |
| 4,882,733 A * | 11/1989 | Tanner ....................... 714/752 |
| 5,050,069 A * | 9/1991 | Hillis et al. .................... 703/13 |
| 5,127,022 A * | 6/1992 | Takegahara et al. ......... 375/244 |
| 5,271,022 A | 12/1993 | Berlekamp et al. |
| 5,659,631 A * | 8/1997 | Gormish et al. ............ 382/166 |
| 5,742,041 A | 4/1998 | Liu |
| 5,778,415 A * | 7/1998 | Marietta et al. ................ 711/5 |
| 5,818,032 A * | 10/1998 | Sun et al. .................... 235/494 |
| 5,917,945 A | 6/1999 | Cymbalski |
| 5,959,285 A * | 9/1999 | Schuessler ............. 235/462.04 |
| 5,974,172 A * | 10/1999 | Chen .......................... 382/166 |
| 6,181,839 B1 | 1/2001 | Kannon et al. |
| 6,211,940 B1 | 4/2001 | Seagrave et al. |

FOREIGN PATENT DOCUMENTS

| | | |
|---|---|---|
| EP | 0 783 160 A2 | 12/1996 |
| EP | 0 825 547 A2 | 2/1998 |

* cited by examiner

*Primary Examiner*—Guy Lamarre
*Assistant Examiner*—Mujtaba K. Chaudry
(74) *Attorney, Agent, or Firm*—Townsend and Townsend and Crew

(57) ABSTRACT

A method is described of detecting two-dimensional codes, in particular matrix codes, which include a plurality of light and dark data bits arranged two-dimensionally, in particular in matrix form. In the method, the code is detected as a gray scale value image; the detected gray scale value image is split into image areas corresponding to the individual data bits and a binarizing threshold representing a specific gray scale value is determined for the image areas. A respective binarizing of the gray scale value of the individual image areas is carried out by means of the binarizing threshold to produce a bit sequence which represents the data bits and consists of the values 0 and 1. The bit sequence is subsequently supplied to an error correction algorithm to recognize and/or correct bit errors within the bit sequence. In accordance with the invention, those so-called uncertain image areas are determined whose gray scale values each lie close to the binarizing threshold. Furthermore, these uncertain image areas are taken into special account in the error correction.

25 Claims, 1 Drawing Sheet

METHOD OF DETECTING TWO-DIMENSIONAL CODES

BACKGROUND OF THE INVENTION

The present invention relates to a method of detecting two-dimensional codes, in particular matrix codes, which include a plurality of light and dark data bits arranged two-dimensionally, in particular in matrix form, wherein the code is detected as a gray scale value image, the detected gray scale value image is split up into image areas corresponding to the individual data bits, a binarizing threshold representing a specific gray scale value is defined for the image areas, binarizing of the gray scale value of the individual image areas is carried out in each case by means of the binarizing threshold to produce a bit sequence representing the data bits and consisting of the values 0 and 1, and the bit sequence is supplied to an error correction algorithm for the detection and/or correction of bit errors within the bit sequence.

The codes are two-dimensional, chessboard-like codes which have been optimized for electronic reading and which are generally termed matrix codes in this application. In the sense of the present application, however, all possible two-dimensional codes come under this heading even if they are not made in matrix form. These codes, which can be present both in square and rectangular form, or in any other two-dimensional arrangement, usually include an implicit error correction process which also allows a decoding in the event of partly destroyed or masked codes by means of localization and correction of the defective data bits. In this connection, the individual code elements of the matrix code are termed data bits, which are usually formed by white and black square or rectangular areas and which correspond to the bars and intermediate spaces in the one-dimensional barcode. The data bits can generally also have a shape deviating from the rectangular shape.

Whereas the known methods for detecting and recognizing the codes have a relatively high decoding reliability when the matrix codes present are error-free, these methods have problems in decoding in particular with codes with low contrast or with poorly printed codes. If too many data bits are incorrectly recognized due to the poor original, an error correction, and thus a decoding of the matrix code, is not possible.

SUMMARY OF THE INVENTION

It is an object of the present invention to further develop a method of the kind initially mentioned such that the decoding reliability is improved, in particular also with poorly printed codes and with codes with low contrast.

This object is satisfied in accordance with the invention starting from a method of the kind initially named in that those so-called uncertain image areas are determined whose gray scale values are each close to the binarizing threshold, and in that these uncertain image areas are taken into special consideration in the error correction.

The method in accordance with the invention thus improves the error correction in that the data bits which will cause problems with a higher probability during decoding are treated separately. Particularly the data bits which are not completely black or not completely white, for example due to a poor print original or due to a low contrast, but which have a gray scale value which is close to the binarizing threshold, will cause defective value with the highest probability during binarizing. Taking the so-called uncertain bits corresponding to these data bits in the bit sequence produced into special account ultimately results in the error correction being able to be improved for the total decoding.

In accordance with an advantageous embodiment of the invention, the taking into special account of the uncertain image areas is carried out in that, for at least one of the uncertain image areas, a different value is assigned to the corresponding data bit than is pre-set by the ratio of the detected gray scale value of the image area to the binarizing threshold.

For example, in accordance with a preferred embodiment, an error correction algorithm can be used for error correction which also allows the value "indefinite" in addition to the values 0 and 1 for a certain number of bits of the bit sequence, with at least some or all of the so-called uncertain bits of the bit sequence associated with the uncertain image areas being supplied to the error correction algorithm with the value "indefinite". With such error correction algorithms, the uncertain bits can be input as so-called "erasure" bits. These erasure bits are indefinite with respect to their values and can be corrected more easily by corresponding error correction algorithms than bits whose respective values are incorrect and whose position in the bit sequence is unknown. By pre-setting the uncertain bits as erasure bits, both their positions within the bit sequence can be transferred to the error correction algorithm and the correct value for these bits can be determined more easily.

If an error correction algorithm is used in which the option of defining erasure bits as the input is not present, then in accordance with a further advantageous embodiment of the invention, a plurality of different bit sequences can be produced in that the values of the so-called uncertain bits associated with the uncertain image areas are inverted in different variations. In this connection, the different bit sequences are preferably supplied to the error correction algorithm for so long until a successful error correction was able to be performed. Usually, the original bit sequence is selected as the first bit sequence with which the uncertain bits thus have their values determined by the binarizing. If this original bit sequence does not result in a successful error correction and thus not to a successful decoding, then the specified different bit sequences are produced by varying the respective values of the uncertain bits and supplied to the error correction algorithm.

Analogously, the bit sequences can also be produced in that the values of at least some or all of the uncertain bits associated with the uncertain image areas are set to "indefinite" in different variations.

To produce the different bit sequences, the indefinite bits are preferably inverted or set to "indefinite" in the order of their indefiniteness; that is, first that bit is inverted or set to "indefinite" for which the gray scale value of the image area associated with it is closest to the binarizing threshold. The uncertain bits are thus inverted or set to "indefinite" in accordance with their values. For this purpose, it is sensible to first sort the uncertain bits according to their uncertainty, with the bits having the highest values whose gray scale values have the lowest distance from the binarizing threshold.

The number of uncertain bits to be inverted or set to "indefinite" is advantageously limited to a maximum value so that the effort for the decoding can be kept in a predetermined framework. Such a limitation can also be sensible for security reasons since the probability for an erroneous decoding simultaneously increases with too high a number of inverted bits or bits set to "indefinite".

Those image areas are advantageously classified as uncertain image areas whose gray scale values each fall below a specific distance, in particular a settable distance, to the binarizing threshold. In this connection, the distance can form a limit both above and below the binarizing threshold.

In accordance with an advantageous embodiment of the invention, the positions of the uncertain image areas in the gray scale value image are detected. In this connection, the respective position of the so-called uncertain bit in the produced bit sequence associated with the uncertain image area is in particular detected to detect the positions of the uncertain image areas. The detection of the positions of the uncertain bits is in particular sensible when these positions are required for the inputting of the erasure bits into the error correction algorithm. The determination of the position of the uncertain bits within the bit sequence is likewise necessary to be able to carry out the desired inversion of the uncertain bits within the bit sequence in a direct manner, for example by corresponding bit masks.

In accordance with a further advantageous embodiment of the invention, the binarizing threshold is determined using predetermined data bits in the matrix code. In this connection, they can, for example, be selected, representative points in the matrix code. It is generally also possible for a predetermined value or a value determined from the totality of the detected data bits to be used as the binarizing threshold.

It is furthermore possible to determine the binarizing threshold dynamically, in particular continuously, in dependence on the gray scale value development over the detected image areas. In this connection, a mean gray scale value development can in particular be taken into account. This has the advantage that, when the binarizing threshold is determined, a possible change in the gray scale values over the area of the detected gray scale value image is taken into account, which can occur, for example, due to special light conditions or by application of a code to a curved surface.

Preferably, only such image areas are used for determining the dynamic binarizing threshold whose gray scale values each have a certain minimum distance from the current binarizing threshold. It is thereby prevented that, in the matching calculation of the dynamic binarizing threshold, image areas are taken into account which, due to their gray scale value lying close to the binarizing threshold, have possibly been incorrectly binarized.

The gray scale value of the geometrical center of the image area can in each case be used as the gray scale value of an image area. For this purpose, for example, the respective centers of the image areas of the detected gray scale value image can be scanned and the respective gray scale value of these centers can be determined. Generally, however, any other suitable gray scale value determination is also possible for the method in accordance with the invention. For instance, a mean gray scale value respectively determined over the area of the image area can, for example, be used as the gray scale value.

The maximum number of the bit errors which can be corrected by the error correction algorithm is preferably adjustable. The effort for the decoding is also limited by this.

The method of the invention can be used with any desired two-dimensional codes, including with the variant Datamatrix ECC 200, with the QR code or with the Maxicode.

The detection of the gray scale value image can take place by any suitable image detection unit, for example by a CCD camera. The gray scale value images can, for example, be stored as 8 bit gray scale value images so that each image pixel is represented by an 8 bit gray scale value (256 levels). Generally, however, a smaller or a larger gray level depth is also possible.

If the detected matrix code does not include any errors, it can be decoded directly. If, however, there are errors in the bit sequence, then the error correction algorithm preferably either delivers an error-corrected bit sequence or it produces an error signal if an error correction was not possible. In this manner, an incorrect decoding of the matrix code is reliably prevented.

If an error correction is possible, then the error-corrected bit sequence is ultimately decoded.

The invention will be described in more detail in the following with reference to an embodiment and to the drawing.

DESCRIPTION OF THE PREFERRED EMBODIMENTS

Figure 1:
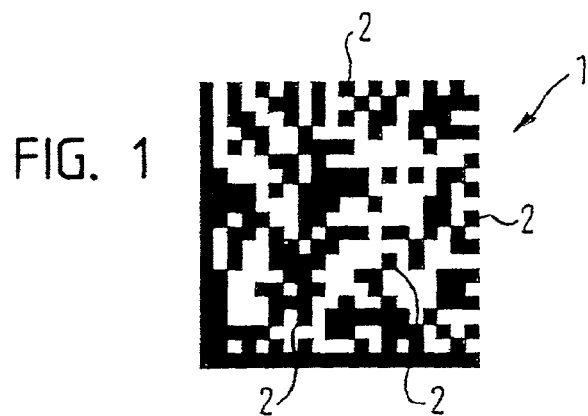
FIG. 1 is an example for a matrix code with 20 lines and 20 columns.

FIG. 1 shows a square matrix code 1 which includes a plurality of square, black and white data bits 2 and data bits 2 arranged in lines and columns.

In the left-hand column in FIG. 1 and in the line shown at the very bottom in FIG. 1, the data bits are all black, whereas in the topmost line shown in FIG. 1 and in the far right-hand column the data bits are each alternately black and white. A localization of the position and rotational position of the code and thus a determination of the size and number of the data bits 2 in the horizontal and vertical direction is possible by this special design, which is also called a "timing pattern".

In accordance with the invention, the matrix code 1 is detected by an image detection unit, for example by a camera, and imaged in a gray scale value image. In this connection, the gray scale values can be coded with 8 bits, for example, so that a gray scale value from 256 gray levels is assigned to each image pixel.

Depending on the resolution of the CCD camera used, for example, each data bit 2 includes a plurality of image pixels which can have different gray scale values in dependence on the print quality of the matrix code 1, for example.

After the matrix code 1 has been rotated by the special border lines and columns of the matrix code 1 such that the lines and columns are aligned, for example, in a Cartesian coordinate system of the image detection unit, the size and the number of the data bits 2 are determined in the horizontal direction and in the vertical direction by usual image examination methods.

A binarizing threshold is subsequently determined with the aid of selected, representative points in the matrix code 1. The binarizing threshold is in this connection a mean value of the detected gray scale values which represents the threshold for the classification of detected gray scale values as "black" or "white". With a corresponding binarizing of the data ranges representing the individual data bits 2 within the gray scale value image, a bit sequence is produced in dependence on the binarizing threshold in accordance with the invention, with each bit being assigned, for example, a 1 for an image area classified as white and a 0 for an image area classified as black. A bit sequence with the length x times y is produced in this way, where x represents the horizontal and y the vertical number of data bits 2 in the matrix code 1.

A scanning of the centers of these image areas can take place, for example, and the image area can be assigned the gray scale value of this center in order to determine the gray scale value of an image area of the detected gray scale value image corresponding in each case to a data bit 2.

Figure 2:
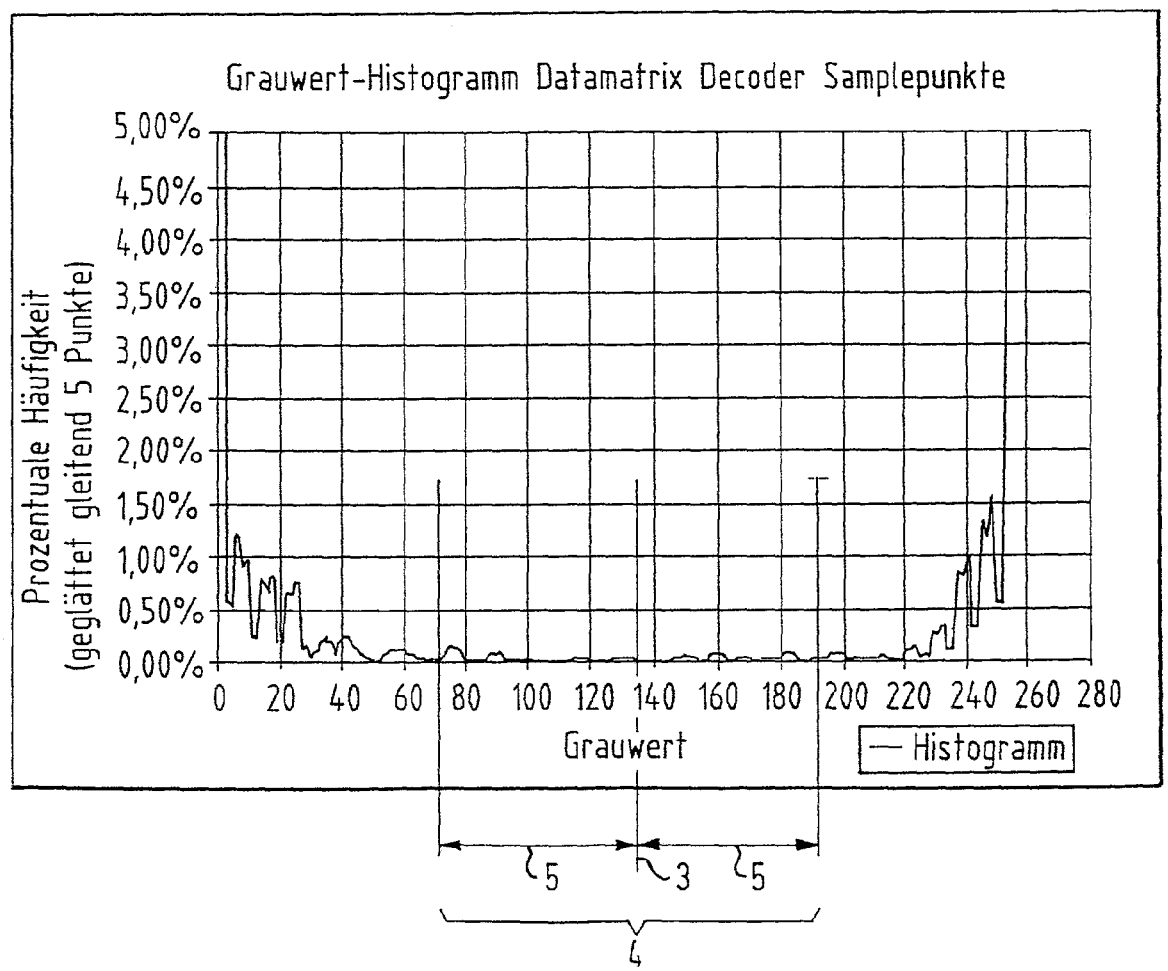
FIG. 2 is a gray scale histogram in the detection of a typical matrix code with a gray scale value resolution of 8 bits (256 levels).

A gray scale value histogram is shown by way of example in FIG. 2 for a typical image of an image of a typical matrix code 1 produced with 8 bits, that is, with 256 gray levels. In this connection, the possible gray scale values between 0 and 256 are shown on the horizontal axis, while their respective percentage frequency within the matrix code is entered on the vertical axis. It can be seen that the most frequent gray scale values lie in the range from 0 (black) to 255 (white). In FIG. 2, a value of 130 is marked by a vertical line 3 as the binarizing threshold. Furthermore, an area 4 is marked which is respectively upwardly defined by a distance 5 and downwardly starting from the binarizing threshold 130. The area 4 forms the so-called uncertainty area in which the gray scale values lie which, in accordance with the present invention, are classified as uncertain. Accordingly, image areas which have gray scale values within the area 4 and their associated bits of the bit sequence produced are termed and classified as uncertain image areas or as uncertain bits. The probability of a bit error is the greatest for these bits so that a special error correction is provided for these bits in accordance with the invention.

Different error correction methods can be used in the method in accordance with the invention. The Reed-Solomon error correction method is known, for example, with the ECC 200 error correction representing a preferred version of this method and thus a specification of how the error correction words are generated. Different algorithms exist for this particular specification of error correction. For example, in accordance with the Berlekamp-Massey algorithm, an ECC 200 error correction can be carried out in which the input of so-called erasure bits is possible. In this case, "indefinite" can be set as the value in each case for the uncertain bits instead of 0 or 1. The error correction is much easier for these erasure bits than for bits whose values are incorrect and whose position in the bit flow is indefinite. This has the result that a much larger number of erasure bits can be corrected. The number of correctable erasure bits can be twice as high as the number of bits correctable without taking erasure bits into account.

If, for example, the Peterson-Gorenstein-Zierler algorithm is used instead of the Berlekamp-Massey algorithm, it is not possible, in contrast, to take erasure bits into account in the error correction. In such error correction algorithms, in which the possibility of inputting erasure bits does not exist, an improvement in the error correction can be achieved in the following manner in accordance with the invention.

The uncertain bits are first sorted according to their values, that is, according to their uncertainty. The uncertainty in this connection increases as the distance of the respective gray scale value of the associated image area from the binarizing threshold decreases.

In the table shown below, three uncertain bits are entered which have different distances from the binarizing threshold 130. Bit #1 has a gray scale value of 128 which is below the binarizing threshold of 130 and thus leads to a resulting binary value of 0. The distance from the binarizing threshold is 2.

Bit #2 has a gray scale value of 145 which is above the binarizing threshold of 130 and thus leads to a resulting binary value of 1. The distance from the binarizing threshold amounts to 15.

Bit #3 has a gray scale value of 112 and thus a resulting binary value of 0. The distance from the binarizing threshold amounts to 18.

Bit #1 thus has the smallest distance from the binarizing threshold, bit #2 the middle distance and bit #3 the largest distance so that the bits in the table are sorted in falling ascendancy in accordance with their uncertainty.

| Bit# | 1 | 2 | 3 |
|---|---|---|---|
| Gray scale value | 128 | 145 | 112 |
| Resulting binary value | 0 | 1 | 0 |
| Distance from binarizing threshold | 2 | 15 | 18 |
| Uncertainty | Largest | Middle | Smallest |

If the bit sequence supplied to the error correction algorithm cannot be corrected with the originally calculated binary values and thus cannot be decoded, a plurality of different bit sequences are produced in accordance with the invention. In this respect, starting from the most uncertain bit, the bit value for supplying to the error correction algorithm is respectively successively inversed. A new, total bit sequence is produced in this manner which will be subjected to the error correction.

With, for example, three uncertain bits, $2^3=8$ possible bit combinations, and thus eight possible total bit sequences, are produced in this manner.

In the table shown below, the patterns for the inversion for all eight possible bit combinations and the resulting bit sequences for all three uncertain bits are shown for the example set forth above.

| # | Pattern for inversion | Resulting bit sequence of uncertain bits |
|---|---|---|
| 1 (= original) | 000 | 010 |
| 2 | 100 | 110 |
| 3 | 010 | 000 |
| 4 | 110 | 100 |
| 5 | 001 | 011 |
| 6 | 101 | 111 |
| 7 | 011 | 001 |
| 8 | 111 | 101 (= all inverted) |

In the first line, "000" is set down as the inversion mask or inversion pattern; this means that all three bits retain their original values.

In the second line, the most uncertain bit with the gray scale value 128 is inverted, which is indicated by the inversion mask "100". The resulting bit sequence results for the uncertain bits at "110". The uncertain bits are accordingly inverted in a descending direction of their uncertainty until the error correction algorithm was able to carry out a successful error correction.

If no error correction is possible with any of the different inversions, then an error code is output.

The uncertain bits are, in practice, normally not arranged directly next to one another as shown in the Table, but distributed over the total bit sequence. For this reason, the positions of the individual uncertain bits must be determined and be known in order to be able to use the inversion masks on the bit sequence with the known bit positions.

Instead of the inversion described, the bits marked with "1" in the "Inversion masks" can each also be set to "indefinite" in order, in this manner, to obtain different bit sequences for the error correction. Using the bit sequences produced in this manner, the error correction can then be carried out with corresponding error correction algorithms while taking into account these "erasure bits" and—if the error correction is successful—the code can be decoded.

The invention claimed is:

1. A method of detecting two-dimensional codes which include a plurality of light and dark data bits arranged two-dimensionally comprising detecting the code as a gray scale value image, splitting the detected gray scale value image into image areas corresponding to the individual data bits, determining a binarizing threshold representing a specific gray scale value for the image areas, carrying out a respective binarizing of the gray scale value of the individual image areas by means of a binarizing threshold to produce a bit sequence which represents the data bits and consists of the values 0 and 1, supplying the bit sequence to an error correction algorithm to recognize and/or correct bit errors within the bit sequence, identifying uncertain image areas whose gray scale values each lie close to the binarizing threshold, taking the uncertain image areas into special account in the error correction, producing a plurality of different bit sequences, and inverting the values of at least some of the uncertain bits associated with the uncertain image areas in different variations or setting these values to "indefinite".

2. A method in accordance with claim 1, wherein the special taking into account of the uncertain image areas is carried out in that, for at least one of the uncertain image areas, a value is assigned to the corresponding data bit which is different from a value that is predetermined by the ratio of the detected gray scale value of the image area to the binarizing threshold.

3. A method in accordance with claim 1, wherein an error correction algorithm is used for the error correction which also allows the value "indefinite" for a certain number of bits of the bit sequence in addition to the values 0 and 1; and wherein at least some of the uncertain bits of the bit sequence associated with the uncertain image areas are supplied to the error correction algorithm with the value "indefinite".

4. A method in accordance with claim 1, wherein the Reed-Solomon algorithm is used for the error correction.

5. A method in accordance with claim 1, wherein the different bit sequences are supplied to the error correction algorithm until a successful error correction can be carried out.

6. A method in accordance with claim 1, wherein, to produce the different bit sequences, the uncertain bits are inverted in the order of their uncertainty or are set to "indefinite".

7. A method in accordance with claim 1, wherein, to produce the bit sequences, no, one or multiple uncertain bits are inverted or set to "indefinite".

8. A method in accordance with claim 1, wherein the number of uncertain bits to be inverted or set to "indefinite" is limited to a maximum value.

9. A method in accordance with claim 1, wherein those image areas are classified as uncertain image areas whose gray scale values each fall below a specific distance from the binarizing threshold.

10. A method in accordance with claim 9, wherein the distance from the binarizing threshold is adjustable.

11. A method in accordance with claim 1, wherein the positions of the uncertain image areas in the gray scale value image are detected.

12. A method in accordance with claim 11, wherein, for detecting the positions of the uncertain image areas, the respective position of the uncertain bit associated with the uncertain image area in the bit sequence produced is detected.

13. A method in accordance with claim 1, wherein the binarizing threshold is determined using pre-set data bits in the code.

14. A method in accordance with claim 1, wherein a predetermined value is used as the binarizing threshold.

15. A method in accordance with claim 1, wherein the code Datamatrix ECC 200, the QR code or the Maxicode are used as the code.

16. A method in accordance with claim 1, wherein the error correction algorithm either supplies an error-corrected bit sequence or produces an error signal if an error correction was not possible.

17. A method in accordance with claim 16, wherein the error-corrected bit sequence is decoded.

18. A method of detecting two-dimensional codes which include a plurality of light and dark data bits arranged two-dimensionally comprising detecting the code as a gray scale value image, splitting the detected gray scale value image into image areas corresponding to the individual data bits, determining a binarizing threshold representing a specific gray scale value for the image areas, carrying out a respective binarizing of the gray scale value of the individual image areas by means of a binarizing threshold to produce a bit sequence which represents the data bits and consists of the values 0 and 1, supplying the bit sequence to an error correction algorithm to recognize and/or correct bit errors within the bit sequence, identifying uncertain image areas whose gray scale values each lie close to the binarizing threshold, taking the uncertain image areas into special account in the error correction, and using the gray scale value of the geometrical center of the image area as the gray scale value of an image area.

19. A method in accordance with claim 18, wherein a plurality of different bit sequences are produced and wherein the values of at least some uncertain bits associated with the uncertain image areas are inverted in different variations or are set to "indefinite".

20. A method in accordance with claim 18, wherein the binarizing threshold is determined dynamically in dependence on the gray scale value development over the detected image areas.

21. A method in accordance with claim 18, wherein only such image areas are used for determining the dynamic binarizing threshold whose gray scale values have a respective specific minimum distance from the current binarizing threshold.

22. A method of detecting two-dimensional codes which include a plurality of light and dark data bits arranged two-dimensionally comprising detcting the code as a gray scale value image, splitting the detected gray scale value image into image areas corresponding to the individual data bits, determining a binarizing threshold representing a specific gray scale value for the image areas, carrying out a respective binarizing of the gray scale value of the individual image areas by means of a binarizing threshold to produce a bit sequence which represents the data bits and consists of the values 0 and 1, supplying the bit sequence to an error correction algorithm to recognize and/or correct bit errors within the bit sequence, identifying uncertain image areas whose gray scale values each lie close to the binarizing threshold, taking the uncertain image areas into special account in the error correction, and using for the gray scale value of an image area there is used a respective mean gray scale value determined over the surface of the image area.

23. A method of detecting two-dimensional codes which include a plurality of light and dark data bits arranged two-dimensionally comprising detecting the code as a gray scale value image, splitting the detected gray scale value image into image areas corresponding to the individual data bits, determining a binarizing threshold representing a specific gray scale value for the image areas, carrying out a respective binarizing of the gray scale value of the individual image areas by means of a binarizing threshold to produce a bit sequence which represents the data bits and consists of the values 0 and 1, supplying the bit sequence to an error correction algorithm to recognize and/or correct bit errors within the bit sequence, identifying uncertain image areas whose gray scale values each lie close to the binarizing threshold, taking the uncertain image areas into special account in the error correction, and setting the maximum number of the bit errors which can be corrected by the error calculation algorithm to a predetermined value.

24. A method of detecting two-dimensional codes which include a plurality of light and dark data bits arranged two-dimensionally comprising detecting the code as a gray scale value image, splitting the detected gray scale value image into image areas corresponding to the individual data bits, determining a binarizing threshold representing a specific gray scale value for the image areas, carrying out a respective binarizing of the gray scale value of the individual image areas by means of a binarizing threshold to produce a bit sequence which represents the data bits and consists of the values 0 and 1, supplying the bit sequence to an error correction algorithm to recognize and/or correct bit errors within the bit sequence, identifying uncertain image areas whose gray scale values each lie close to the binarizing threshold, taking the uncertain image areas into special account in the error correction, wherein at first that bit is inverted or set to "indefinite" for which the gray scale value of the image area associated with it lies closest to the binarizing threshold.

25. A method of detecting two-dimensional codes which include a plurality of light and dark data bits arranged two-dimensionally comprising detecting the code as a gray scale value image, splitting the detected gray scale value image into image areas corresponding to the individual data bits, determining a binarizing threshold representing a specific gray scale value for the image areas, carrying out a respective binarizing of the gray scale value of the individual image areas by means of a binarizing threshold to produce a bit sequence which represents the data bits and consists of the values 0 and 1, supplying the bit sequence to an error correction algorithm to recognize and/or correct bit errors within the bit sequence, identifying uncertain image areas whose gray scale values each lie close to the binarizing threshold, taking the uncertain image areas into special account in the error correction, dynamically determining a binarizing threshold in dependence on the gray scale value development over the detected image areas, and using only such image areas for dynamically determining the binarizing threshold whose gray scale values have a respective specific minimum distance from the current binarizing threshold.

* * * * *